United States Patent [19]

Schifano

[11] 3,862,777
[45] Jan. 28, 1975

[54] DEVICE FOR FORMING A PROTECTIVE AIRFLOW FORWARD OF FLAT-FRONTED VEHICLES

[76] Inventor: William P. Schifano, 2505 Agate Rd., Boulder, Colo. 80302

[22] Filed: July 19, 1973

[21] Appl. No.: 380,935

[52] U.S. Cl. ................................................. 296/91
[51] Int. Cl. ............................................ B62d 35/00
[58] Field of Search ..................... 296/91, 1 S, 1 R, ; 280/403

[56] References Cited
UNITED STATES PATENTS

| | | | |
|---|---|---|---|
| 2,792,254 | 5/1957 | Hagglund | 296/91 |
| 3,022,848 | 2/1962 | Heiser | 296/91 X |
| 3,214,215 | 10/1965 | Hansen | 296/91 |
| 3,419,897 | 12/1968 | Bratsberg | 29/91 |

Primary Examiner—Stanley H. Tollberg
Attorney, Agent, or Firm—Thomas W. O'Rourke

[57] ABSTRACT

Method and device for producing a protective airflow curtain forward of the windshield of vehicles having substantially flat fronts, i.e., cabover trucks, vans, buses, etc., comprising a concave planar surface having at least one straight edge mounted with such edge adjacent the windshield, a relatively flat surface extending from the concave surface in a direction opposite the windshield, and a barrier between at least one of the surfaces and the vehicle body, thereby redirecting a wind stream impinging upon the surfaces into a curtain flow spaced from and largely parallel to the windshield with the barrier preventing substantial flow of disruptive air behind the surfaces.

6 Claims, 7 Drawing Figures

DEVICE FOR FORMING A PROTECTIVE AIRFLOW FORWARD OF FLAT-FRONTED VEHICLES

BACKGROUND OF THE INVENTION

1. Field of the Invention

The present invention generally relates to airflow deflectors for vehicles, and more particularly to airflow deflectors for vehicles having a substantially flat frontal area, including the windshield, to provide an air screen flow in front of the windshield thereby protecting the windshield from impact of insects, dust, rain and other relatively light matter.

2. Description of the Prior Art

The use of so called "bug deflectors" in front of the windshield of automobiles is a well-known aand accepted principle. Such deflectors are described in, for instance, U.S. Pat. Nos. 2,184,798, 2,338,199, 3,515,604, 3,601,401 and 3,695,674. These patents clearly demonstrate a common principle wherein the airstream travelling over the conventional hood of an automobile or truck is intercepted and deflected upward and substantially forward of the windshield to flow over the top of the vehicle.

Because of the nature of the more modern utilitarian vehicles such as cabover trucks, buses and vans which have a substantially planar frontal area with the windshield located at about the furthermost forward point on the vehicle, such conventional deflectors have proven quite ineffective. The prior art deflectors required the existence of a hood or similar structure located forward of the windshield in order to both position and support the conventional deflector and also to properly form and provide an airstream to be deflected.

For reasons of economy of space and maximum utilization of permissible truck length, it has been common to mount engines either immediately behind the windshield or towards the rear of a vehicle. Accordingly, with no engine to house forward of the windshield, the frontal design of such vehicle has, in essence, become flat with the windshield, though commonly having some rake rearward and not being strictly in a single plane, functionally serving as a portion of the substantially flat front of the vehicle.

There appears to be very little prior art dealing with airflow management over the windshields of flat-fronted vehicles. U.S. Pat. No. 3,696,732 is concerned with such vehicles, but deals only with airflow over side windows. Accordingly, it appears that the benefit of airstream deflectors are not currently available to users of flat-fronted vehicles, even though these vehicles, and particularly heavy, over-the-road trucks, can greatly benefit from the protection afforded by such deflectors with regard to minimization of impacting of dirt, insects, rain and other debris upon the windshield.

SUMMARY OF THE INVENTION

The present invention, which provides a heretofore unavailable means for producing a protective airflow in front of the windows of flat-fronted vehicles, comprises a concave, curved surface mounted adjacent the edge of the windshield and facing into the airstream generated by the movement by the vehicle. The surface is curved or "hooked" toward one end with a relatively flat portion leading to the curved end. By relatively flat, it is meant that such surface has a curvature less than that of the concave surface. When mounted, the curved end of the deflector is directed both forward of the vehicle and with a component towards the windshield. A barrier is provided to block any substantial gap between the rear side of the surfaces and the vehicle body.

The method and device for producing a protective shield of air moving in front of, and substantially parallel to, the windshield of flat-fronted vehicles provides effective protection against the impacting of matter in the path of the vehicle upon the windshield.

Accordingly, an object of the present invention is to provide a new and improved device for deflecting an airstream forward of the windshield of a flat-fronted vehicle.

Another object of the present invention is to provide a new and improved method of inducing airflow from a point substantially in the same vertical plane as a windshield forward of and over the windshield.

Yet another object of the present invention is to provide a new and improved method and device to deflect an airstream an amount greater than 90° from its initial direction and thereby minimize contact of the protective airstream with the windshield.

These and other objects of the present invention will become apparent from the following description.

DETAILED DESCRIPTION OF THE INVENTION

Figure 1:
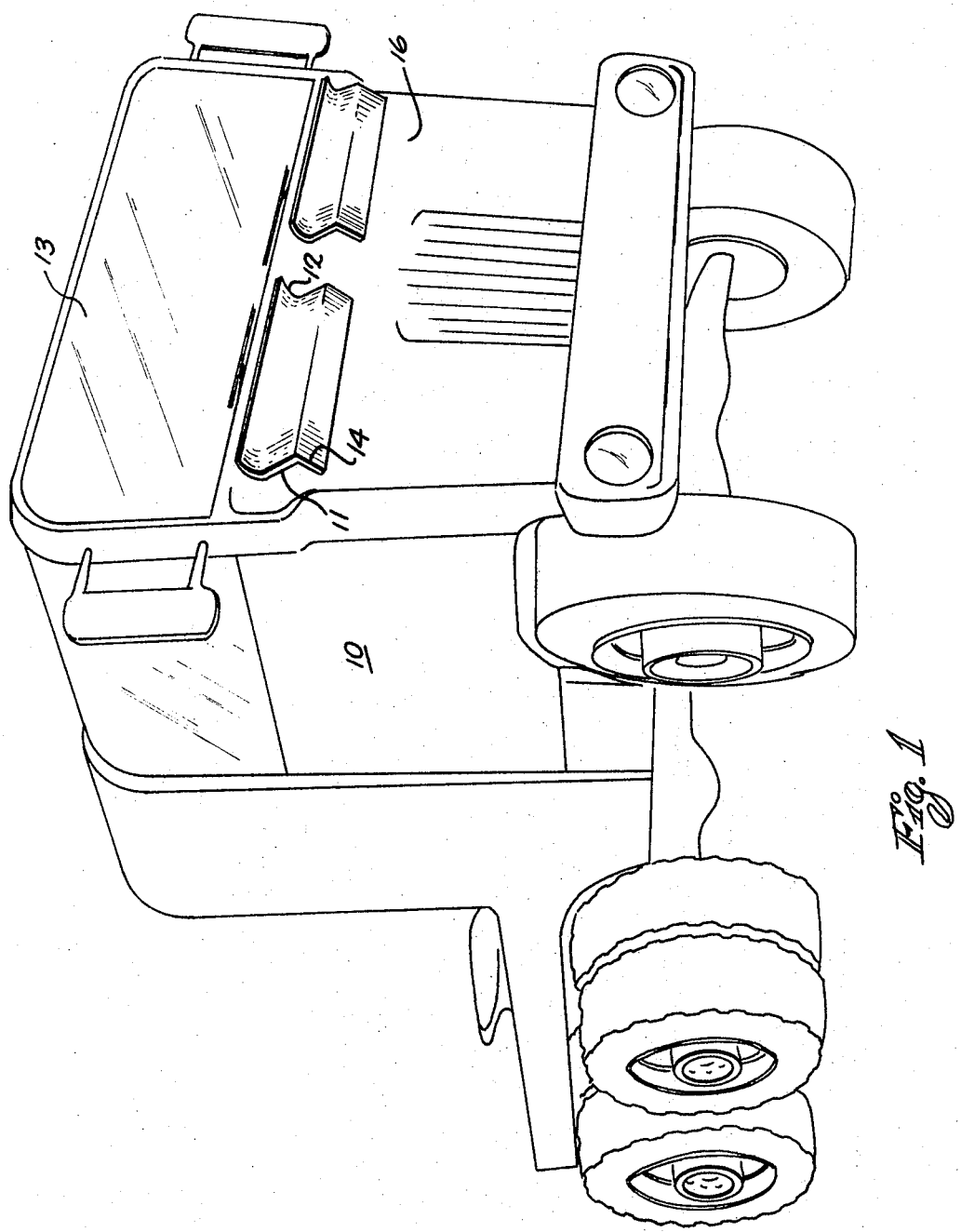
FIG. 1 is a perspective view of a vehicle having the device of the instant invention mounted thereon.

Turning now to the drawings, wherein like components are designated by like reference numerals throughout the various figures, a device for inducing a protective airflow in front of a windshield of a flat-fronted vehicle is illustrated in FIG. 1. More specifically, a flat surface 11 and integral concave curved surface 12 is mounted adjacent the windshield 13 of a vehicle, such as truck 10. Barrier 14 is positioned adjacent the front body section 16 of truck 10 to preclude airflow behind curved, concave surface 12.

Figure 2:
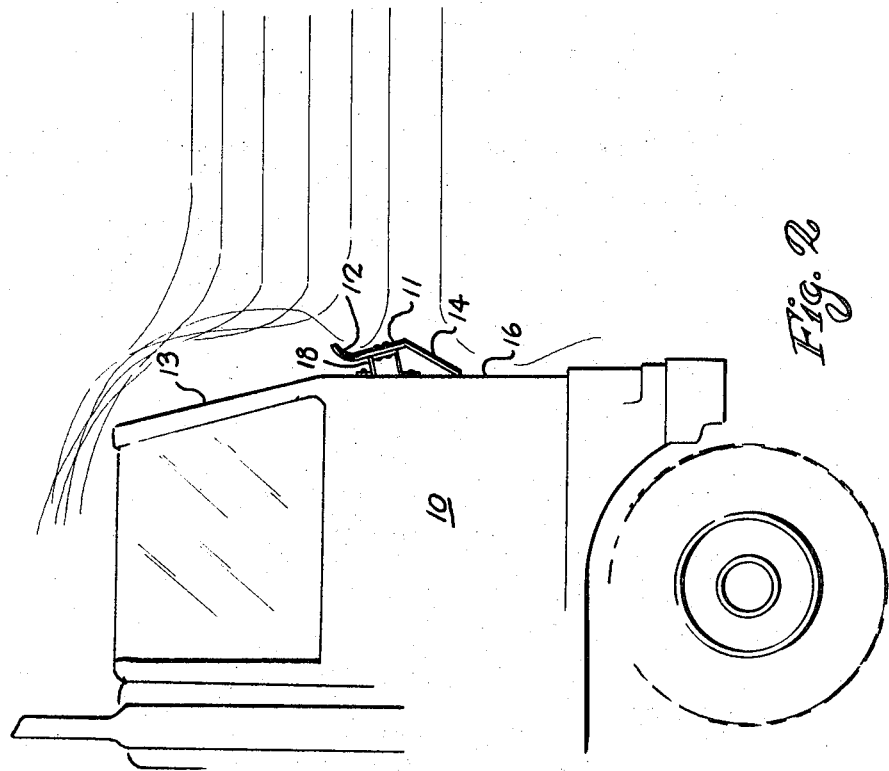
FIG. 2 is a side view of a vehicle having the device of the instant invention mounted thereon with the airflow resulting from the movement of such vehicle depicted.

The effect of concave surface 12 is shown in FIG. 2 by means of airflow stream lines. It is seen that the airstream impinges upon flat surface 11 and curved surface 12 and is deflected upwardly and outwardly in front of windshield 13. Also, it will be noted that the barrier 14 between truck frontal area 16 and flat surface 11 precludes substantial flow behind concave surface 12 which flow would tend to permit the airstream to impinge upon windshield 13 of truck 10 rather than flowing in front of the windshield and over the top of truck 10.

In the drawings, there is some exaggeration of the spacing of concave surface 12 to permit illustration of mounting bracket 18 which is utilized to secure flat surface 11 and concave surface 12, and the preferably integral barrier 14, to truck 10. However, it will be recognized that, in true relationships, concave surface 12 is closely adjacent frontal area 16 of truck 10. Accordingly, it would not have been expected that an air shield could be generated by truck 10 which would not merely guide debris into windshield 13, but would, in fact, carry debris in front of windshield 13 and over the top of truck 10.

Figure 3:
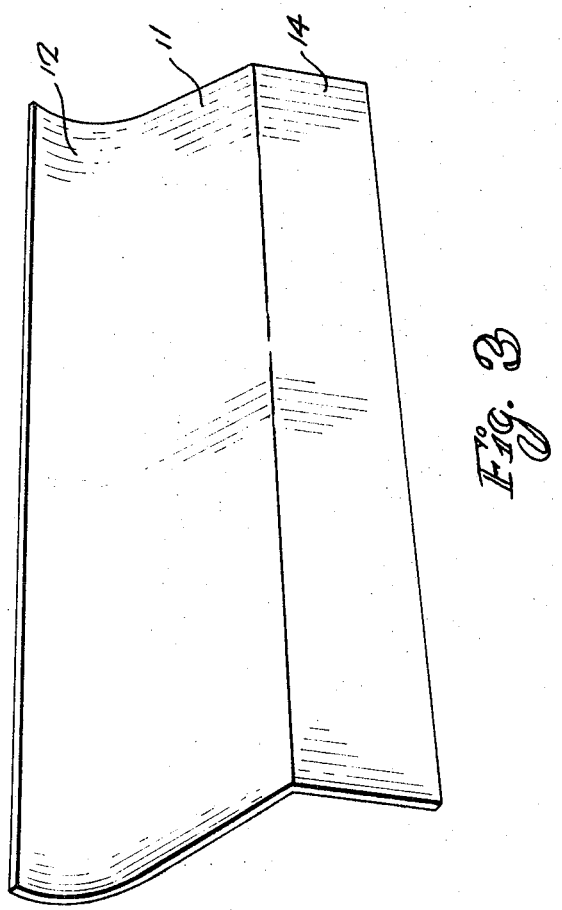
FIG. 3 is a perspective view of the device according to the instant invention.
Figure 7:
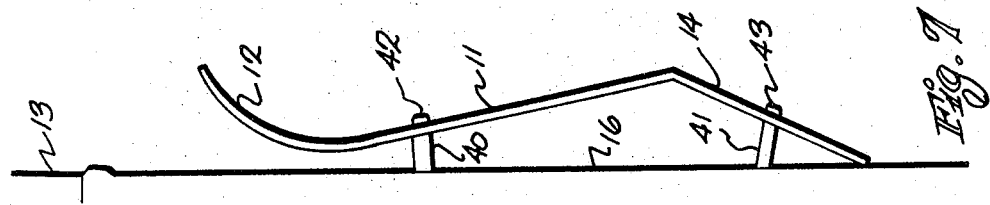
FIGS. 4 through 7 are side views illustrating the various means for mounting the device of the instant invention.

The actual device of the instant invention is illustrated in FIG. 3 and comprises merely a concave surface 12 and flat surface 11 having a barrier portion 14 attached thereto. Preferably, barrier 14 and flat surface 11 are integral with concave surface 12; but barrier 14 may be a separate piece, may be disposed at various angles to concave surface 12, provided it serves the readily recognizable barrier function, or may be a separate part of the mounting bracket system as shown below. It is preferable to form flat surface 11 and concave surface 12 of a unitary surface, but it is, of course, operable to provide the functional parts of the device from any number of composite pieces.

Figure 4:
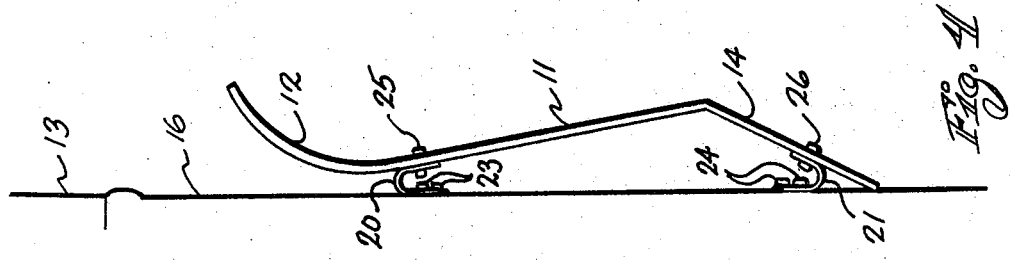

Of course, concave surface 12 may be mounted to truck frontal area 16 by any number of means. For instance, in FIG. 4, mounting straps 20 and 21 are secured to truck frontal area 16 by means of fasteners 23 and 24. Fastener 25 is then utilized to secure concave surface 12 to strap 20 while fastener 26 is utilized to secure integral barrier 14 to strap 21.

Figure 5:
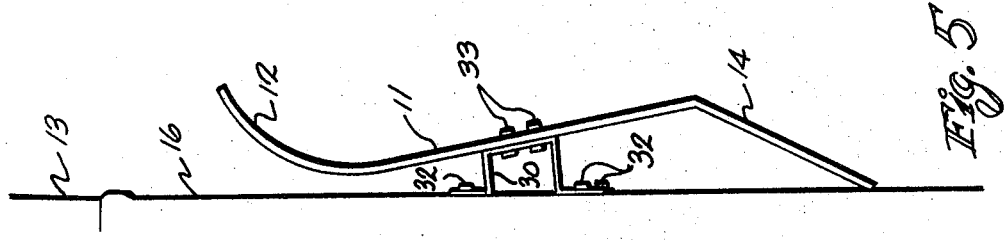

Another mounting means is shown in FIG. 5 wherein a bracket 30 is secured to truck frontal area 16 by fasteners 32. Bracket 30 is also fastened to flat surface 11 at a position towards the center line of the deflector by fasteners 33.

Figure 6:
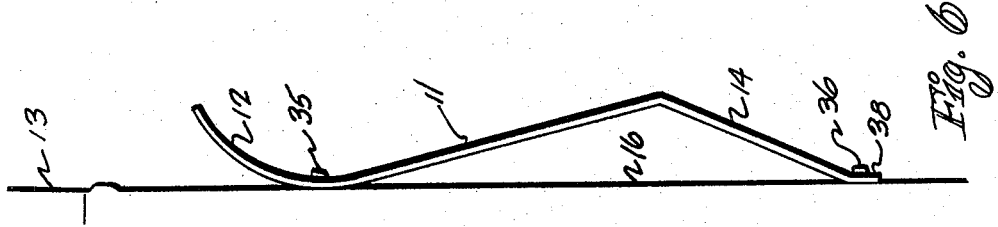

A particularly simple mounting is shown in FIG. 6 wherein fasteners 35 and 36 secure the deflector directly to the truck frontal area 16. Barrier 14 includes tab 38 to facilitate direct mounting.

Direct mounting can also be accomplished by means of stand-offs 40 and 41 which space flat surface 11 and barrier 14 an appropriate distance from truck frontal area 16 to direct attachment by fasteners 42 and 43, respectively.

Thus, it will be apparent that a great number of mounting means can be employed to secure the deflector to the vehicle. Functionally, it is only necessary that the airstream impacting on the deflector creates a pressure imbalance biased toward the side of the deflector toward the windshield. This will provide an airflow towards the windshield in general. Preferably, this is accomplished by the relatively flat surface which slopes, relative to the airflow towards the windshield. Once the airflow is thus established towards the windshield, it is necessary to direct it forward of the windshield to produce a protective air curtain. The concave curved surface serves this purpose. However, if the curved surface is to effectively redirect the airflow more than 90° to the original direction of airflow travel, it has been found that airflow behind the deflector must be precluded. Accordingly, a barrier is provided to prevent such a disruptive flow behind the deflector.

Although several embodiments of the invention have been described and illustrated, it is apparent that various changes and modifications can be readily made by those skilled in the art and that such changes and modifications can be made without departing from the scope of the invention as defined by the following claims.

What is claimed is:

1. A wind deflector mounted on a substantially flat-fronted vehicle with a windshield portion being included in the front, the wind deflector comprising: a concave curved planar surface having at least one substantially straight edge positioned adjacent an edge of the windshield, a relatively flat surface of a curvature less than that of the concave surface extending from the concave surface in a direction away from the windshield, and a barrier surface extending from the edge of the substantially flat surface opposite the curved surface to a position in close proximity to the vehicle front, whereby an airstream impinging upon the relatively flat surface will be induced to flow toward the curved surface, the curved surface will direct the airflow in a direction more than 90° to the airstream direction and the barrier surface will diminish air movement behind the curved surface.

2. A wind deflector as described in claim 1 wherein the curved surface, the substantially flat surface and the barrier surface are formed of a unitary piece of material.

3. A wind deflector as described in claim 1 wherein the relatively flat surface is joined to the curved surface in a tangent relationship thereto and the barrier surface is attached to the opposite end of the relatively flat surface and angled therefrom in an opposite direction than the curved surface.

4. A wind deflector secured to the front of a vehicle having a substantially flat, vertical frontal area with a windshield forming a portion of the frontal area, the deflector being mounted to the frontal area adjacent the windshield with a curved, concave surface immediately adjacent the windshield, a relatively flat surface having a curvature less than that of the curved surface extending from the curved surface at the side of the curved surface opposite the windshield, and a barrier surface between at least one of the curved surfaces and relatively flat surface and the vehicle frontal area.

5. A wind deflector as described in claim 4 wherein the relatively flat surface is mounted with the portion thereof adjacent the curved surface closer to the vehicle frontal area than the portion of the relatively flat surface which is more remote from the curved surface.

6. A wind deflector as described in claim 5 wherein the barrier surface extends from the portion of the relatively flat surface remote from the curved surface to the vehicle frontal area.

* * * * *